United States Patent
Consul et al.

(10) Patent No.: US 9,165,056 B2
(45) Date of Patent: Oct. 20, 2015

(54) GENERATION AND USE OF AN EMAIL FREQUENT WORD LIST

(75) Inventors: Ashish Consul, Redmond, WA (US); Suryanarayana Murty Gorti, Redmond, WA (US); Andrew E. Goodsell, Redwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 985 days.

(21) Appl. No.: 12/142,622

(22) Filed: Jun. 19, 2008

(65) Prior Publication Data

US 2009/0319483 A1 Dec. 24, 2009

(51) Int. Cl.
*G06F 7/00* (2006.01)
*G06F 17/30* (2006.01)
*G06Q 10/10* (2012.01)
*G06F 17/27* (2006.01)

(52) U.S. Cl.
CPC ........ *G06F 17/30613* (2013.01); *G06Q 10/107* (2013.01); *G06F 17/2775* (2013.01)

(58) Field of Classification Search
CPC .................................................. G06F 17/2775
USPC ......................................... 707/826, 726, 769
See application file for complete search history.

(56) References Cited

U.S. PATENT DOCUMENTS

| | | | |
|---|---|---|---|
| 6,029,195 A | 2/2000 | Herz | |
| 6,760,694 B2 | 7/2004 | Al-Kazily et al. | |
| 6,778,941 B1 | 8/2004 | Worrell et al. | |
| 6,829,607 B1 * | 12/2004 | Tafoya et al. | 1/1 |
| 7,284,191 B2 | 10/2007 | Grefenstette et al. | |
| 7,359,891 B2 | 4/2008 | Nishino et al. | |
| 7,574,349 B2 * | 8/2009 | Perronnin | 704/9 |
| 7,836,061 B1 * | 11/2010 | Zorky | 707/749 |
| 8,150,798 B2 * | 4/2012 | Ma et al. | 707/608 |
| 2002/0099681 A1 * | 7/2002 | Gainey et al. | 707/1 |
| 2003/0061025 A1 | 3/2003 | Abir | |
| 2003/0221160 A1 | 11/2003 | Van Den Tillaart | |
| 2005/0086205 A1 * | 4/2005 | Franciosa et al. | 707/3 |
| 2006/0206306 A1 * | 9/2006 | Cao et al. | 704/4 |
| 2006/0282303 A1 * | 12/2006 | Hale et al. | 705/10 |
| 2007/0016614 A1 * | 1/2007 | Novy | 707/104.1 |
| 2007/0179945 A1 | 8/2007 | Marston et al. | |
| 2007/0217693 A1 * | 9/2007 | Kretzschmar, Jr. | 382/229 |
| 2008/0009300 A1 | 1/2008 | Vuong | |
| 2009/0150365 A1 * | 6/2009 | Chow et al. | 707/4 |
| 2013/0246338 A1 * | 9/2013 | Doddapaneni | 707/602 |

OTHER PUBLICATIONS

Meyer, Advanced Version of Word Frequency Counter Software Released, Download3K.com, downloaded Apr. 29, 2008 from http://www.downloade3k.com/Press-Adavanced-Version-of_Word_-Frequency-Counter.html, pp. 3.

(Continued)

*Primary Examiner* — Khanh Pham
*Assistant Examiner* — Eliyah S Harper
(74) *Attorney, Agent, or Firm* — Louise Bowman; Danielle Johnston-Holmes; Micky Minhas

(57) ABSTRACT

Technologies are described herein for generating a mailbox specific frequent word list associated with a mailbox. In one method, an index scan is performed on catalogs to retrieve search data mapping words to emails containing the words. The search data is provided across multiple mailboxes. A universal frequent word list is generated based on the search data. The mailbox specific frequent word list is generated based on the universal frequent word list.

16 Claims, 4 Drawing Sheets

(56) References Cited

OTHER PUBLICATIONS

Jakadasoft, "Word Sorter", 100Ofiles.com and Soflexe.com, downloaded Apr. 29, 2008 from http://www.1000files.com/Home_and_Education/Language/Word_Sorter_13530_Review, pp. 3.

Aery, "Infosift: Adapting Graph Mining Techniques for Document Classification", The University of Texas at Arlington in Partial Fulfillment of the Requirements for the Degree of Master of Science in Computer Science and Engineering, Dec. 2004, pp. 101.

Aery, et al., "eMailSift: Adapting Graph Mining Techniques for Email Classification", Jul. 29, 2004, Technical Report, Department of Computer Science and Engineering, University of Texas at Arlington, pp. 1-24.

Boone, "Concept Features in Re: Agent, &n Intelligent Email Agent", 1998, pp. 141-148.

Meyer, "Advanced Version of Word Frequency Counter Software Released", 2005-2007, Download3K.com, pp. 3.

Jakadasoft, "Word Sorter", 1000files.com and Softexe.com, 2002-2008, pp. 3.

\* cited by examiner

GENERATION AND USE OF AN EMAIL FREQUENT WORD LIST

BACKGROUND

In recent years, electronic mail ("email") has become one of the most important forms of communication for various personal and business uses. The growth of e-mail communications has been spurred, at least in part, by the increasing number of devices capable of remotely accessing email. For example, many mobile devices, such as cellular phones, smartphones, and personal digital assistants ("PDAs"), are now capable of remotely and wirelessly accessing email through various pull-based and push-based e-mail access protocols.

A typical user's mailbox may contain hundreds or thousands of e-mails on a wide variety of topics ranging from the user's plans for lunch at her favorite cafe to the user's input regarding her workgroup's latest business project. A user's e-mails may also be utilized to infer information about the user. For example, a higher frequency of e-mails to certain people may indicate that the user has a closer relationship with those people. As a result, a user's mailbox can be a valuable source of relevant information about the user, especially for application programs that can utilize or benefit from such information.

It is with respect to these considerations and others that the disclosure made herein is presented.

SUMMARY

Technologies are described herein for generating, organizing, storing, and utilizing a frequent word list associated with a user's mailbox. In particular, through the utilization of the technologies and concepts presented herein, an application program interface ("API") is described that is adapted to generate a frequent word list based on email messages contained in a user's mailbox and to respond to requests from external application programs requesting the frequent word list. The frequent word list may include a mapping of words to a frequency of use for each of the words.

In one method, an index scan is performed on catalogs to retrieve search data that maps words to emails containing the words. The search data is provided across multiple mailboxes. A universal frequent word list is generated based on the search data. The mailbox specific frequent word list is generated based on the universal frequent word list.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for generating, organizing, storing, and using a frequent word list associated with a user's mailbox. An API is described herein that is adapted to generate a frequent word list based on emails contained in a user's mailbox. This frequent word list is referred to herein as a mailbox specific frequent word list because it contains only words associated with the user's mailbox. The API may further be adapted to respond to requests from application programs or other services requesting the mailbox specific frequent word list.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
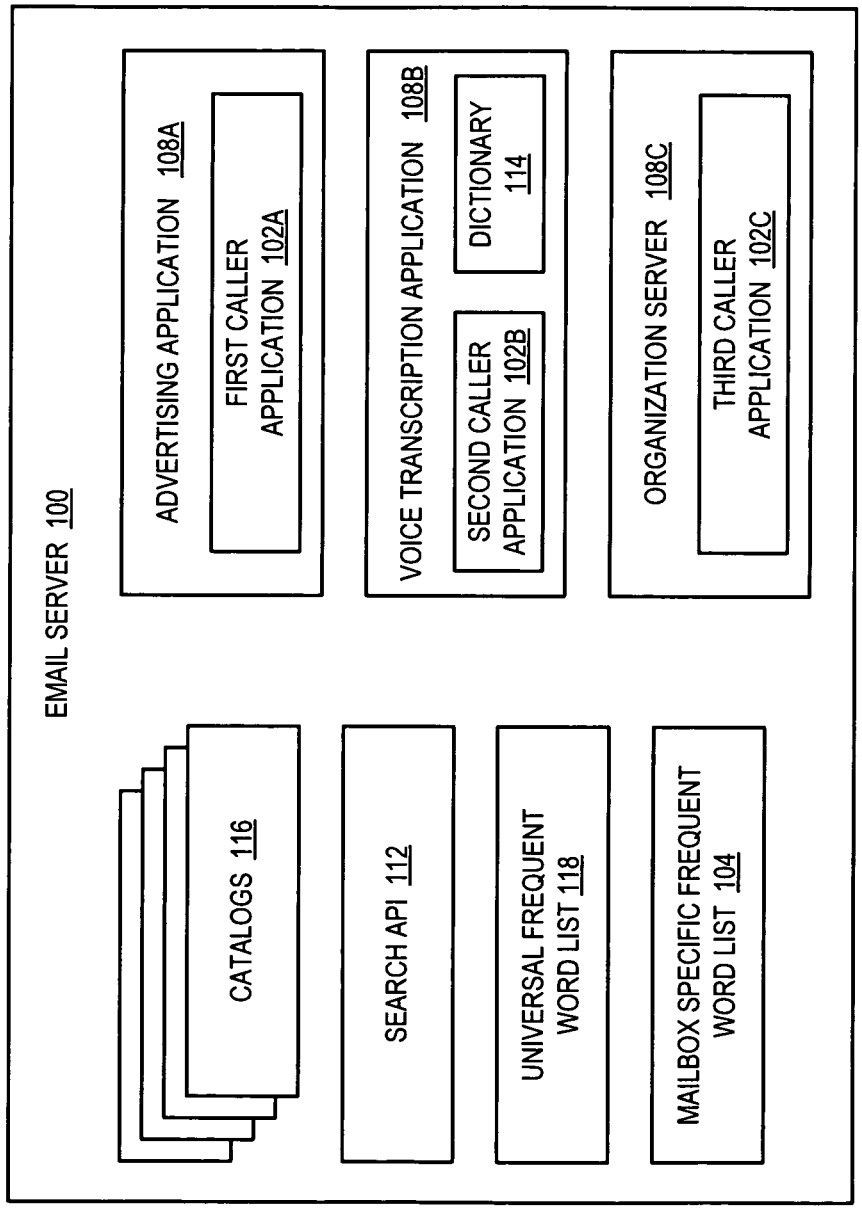
FIG. 1 is a block diagram showing an email server configured to generate a mailbox specific frequent word list, in accordance with one embodiment.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for generating, organizing and storing a frequent word list for a given mailbox will be described. FIG. 1 shows an illustrative email server 100 in which multiple caller applications 102A-102B (collectively referred to as caller applications 102) request a frequent word list for a specific mailbox associated with a given user. An example of a frequent word list for a specific mailbox is a mailbox specific frequent word list 104. For the sake of simplicity, in the example shown in FIG. 1, each of the caller applications 102 requests the mailbox specific frequent word list 104. However, it should be appreciated that the caller applications 102 may each request frequent word lists for other mailboxes. It should further be appreciated that other types of application programs and/or services may request the mailbox specific frequent word list 104 and the like.

According to embodiments, the mailbox specific frequent word list 104 includes a list of frequent words found in a user's mailbox and a corresponding frequency associated with each of the words. The list of frequent words may be sorted in order of frequency. For example, the most frequent words may be shown at the top of the mailbox specific frequent word list 104, and the remaining words may be shown in a descending order of frequency. The frequency may be specified as a raw frequency (e.g., the absolute number of email messages that include a word) or a percentage/ratio (e.g., the number of email messages that include a word in relation to the total number of messages across the user's mailbox).

The mailbox specific frequent word list 104 may be formatted in Extensible Markup Language ("XML") or other suitable representation. An example of an XML data structure for an entry in the mailbox specific frequent word list 104 is shown below.

<TopNWord="_____" Frequency="_____"></TopNWord>

The "TopNWord" tag specifies a word found in a user's mailbox. The "frequency" property specifies the frequency that the word is found in the user's mailbox. It should be appreciated that other forms for representing entries in the mailbox specific frequent word list 104 may be contemplated by those skilled in the art.

As shown in FIG. 1, the email server 100 includes a variety of application programs, such as an advertising application 108A, a voice transcription application 108B, and an organization application 108C (collectively referred to as applications 108). The advertising application 108A includes a first caller application 102A, which is adapted to transmit a request for the mailbox specific frequent word list 104 to a search API 112. The voice transcription application 108B includes a second caller application 102B, which is adapted to transmit a request for the mailbox specific frequent word list 104 to the search API 112. The organization application 108C includes a third caller application 102, which is adapted to transmit a request for the mailbox specific frequent word list 104 to the search API 112.

In one embodiment, the advertising application 108A may tailor advertisements to a user based on the contents of a mailbox specific frequent word list 104 associated with the user. For example, the mailbox specific frequent word list 104 may include a high frequency of baby-related words, such as "crib," "diapers," and "stroller." As a result, the advertising application 108A may recognize these baby-related words and tailor advertisements to the user in accordance with baby-related products and services. For example, tailored advertisements may be displayed to the user within an ad-supported web application, such as a hosted email application.

In another embodiment, the voice transcription application 108B may supplement a transcription dictionary 114 with proper nouns, slang, abbreviations, and other colloquial terminology found in the mailbox specific frequent word list 104. Voice transcription applications are increasingly included in email application programs, especially in unified messaging application programs, whereby a voicemail or other audio message is transcribed into text so that a user can "read" the voicemail. In an exemplary implementation, the voice transcription application 108B may receive an audio sequence of speech and then phonetically map the audio sequence to one or more words in the transcription dictionary 114. This implementation may be adequate when the audio sequence corresponds to words in the transcription dictionary 114. However, problems can occur when the audio sequence corresponds to words not found in the transcription dictionary 114.

In an example, an audio sequence may include the name "Gautam," which is a name that is common in some non-U.S. countries. An American implementation of the transcription dictionary 114 may not include proper nouns or foreign names, such as Gautam. As a result, the voice transcription application 108B may incorrectly transcribe the audio representation of Gautam as "Gotham," "got him," or "got them." Alternatively, the voice transcription application 108B may indicate that it does not recognize the word by providing an error message.

The mailbox specific frequent word list 104 may indicate that the name Gautam is frequently used in the user's emails. As such, the voice transcription application 108B may add Gautam to the transcription dictionary 114. In one embodiment, the voice transcription application 108 may place a greater weight on words, such as Gautam, that are frequently included in the user's emails over similarly sounding counterparts, such as Gotham, that are not frequently included in the user's emails. By supplementing the transcription dictionary 114 with colloquial words associated with a user, the accuracy of the voice transcription application 108B can be significantly improved. In particular, the transcription dictionary 114 can be effectively customized for a given user by adding words from the user's own real-world vocabulary found in the mailbox specific frequent word list 104.

In yet another embodiment, the organization application 108C may generate email tags based on frequently used words found in the mailbox specific frequent word list 104. As used herein, an email tag refers to a word that is associated with emails. The email tags essentially serve as reference markers, enabling users to quickly identify, browse, and search for classes of emails as specified by the email tags. By restricting email tags to the most frequently used words, more relevant email tags can be provided for various automatic and manual tagging applications.

It should be appreciated that the applications 108 described herein are merely exemplary. Other applications that can utilize or benefit from the data provided in the mailbox specific frequent word list 104 may be contemplated by those skilled in the art. It should further be appreciated that the applications 108 may be external applications executed on other computers. For example, the advertising application 108A may be an external application that is capable of communicating with the email server 100 through a network (not shown).

As shown in FIG. 1, the email server 100 further includes a plurality of catalogs 116 and a universal frequent word list 118. As described in greater detail below with respect to FIG. 2, the search API 112 is adapted to search the catalogs 116 for frequent words across multiple mailboxes. Upon receiving the frequent words from the catalogs 116, the search API 112 may generate the universal frequent word list 118. The universal frequent word list 118 may contain a list of frequent words across multiple mailboxes and a frequency associated with each of the words. The search API 112 may utilize the universal frequent word list 118 to generate mailbox specific frequent word lists, such as the mailbox specific frequent word list 104, as requested by the applications 108.

Figure 2:
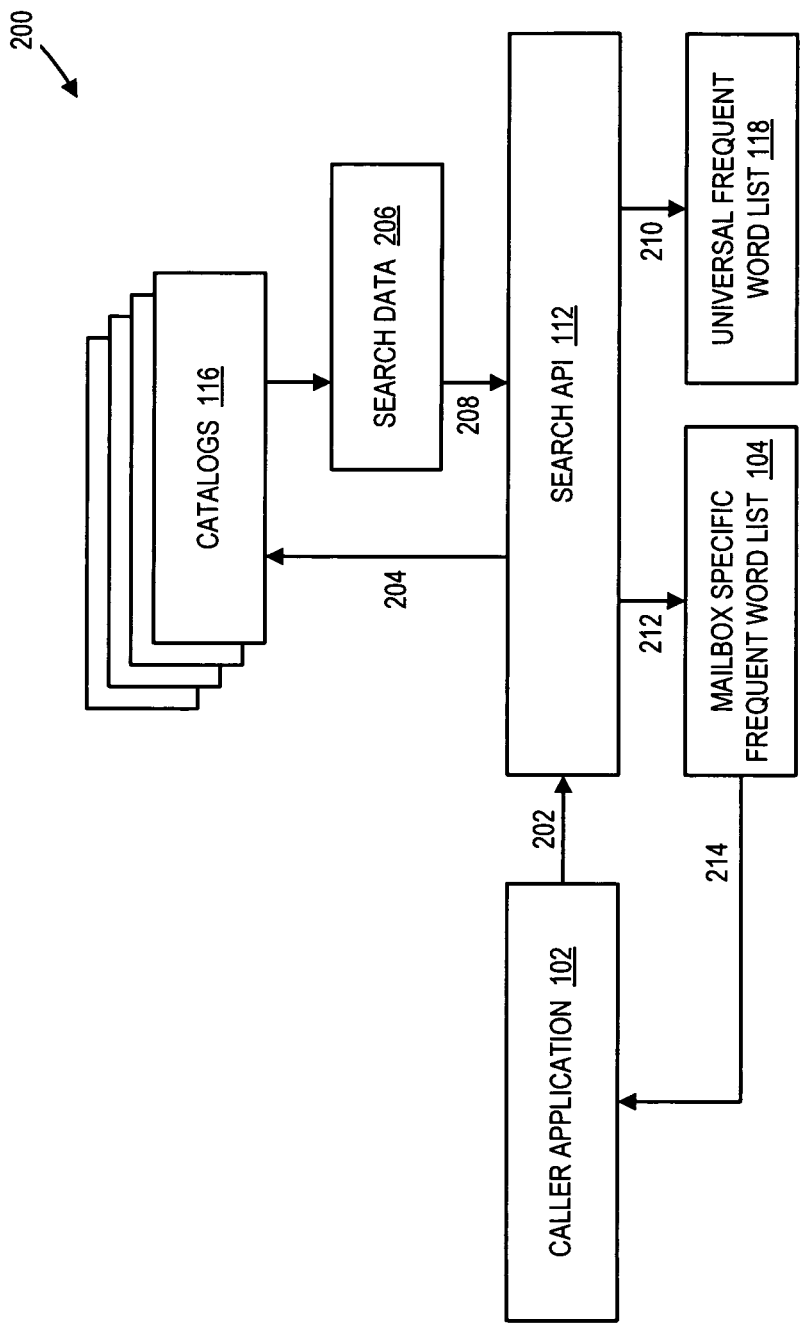
FIG. 2 is a block diagram showing a process flow for generating the mailbox specific frequent word list, in accordance with one embodiment.

Referring now to FIG. 2, additional details will be provided regarding the operation of the search API 112. In particular, FIG. 2 shows an illustrative process flow 200 for generating the mailbox specific frequent word list 104. The process flow 200 begins at 202, where the caller application 102 transmits to the search API 112 a request for a mailbox specific frequent word list, such the mailbox specific frequent word list 104, associated with a given user. In one embodiment, the request may specify, among other things, the number of entries included in the mailbox specific frequent word list 104, the minimum/maximum frequency of the entries included in the mailbox specific frequent word list 104, and the minimum/maximum age of the entries included in the mailbox specific frequent word list 104.

The process flow 200 proceeds to 204, where upon receiving the request for the mailbox specific frequent word list 104, the search API 112 performs an index scan on the catalogs 116. The catalogs 116 may include search data 206, which contains an inverted index data structure mapping words to the emails that contain the words. The emails may be identified by a document identifier. For example, an illustrative entry in the catalogs 116 may include the following:

| "apple": | {0, 1, 3, 6, 9} |
| "bear": | {2, 3, 5} |

The conventional purpose of the inverted index data structure is to enable fast searching of emails. For example, if a user wants to find all documents that include the word apple, a search engine can access the inverted index data structure to quickly determine that emails corresponding to each of the document identifiers {0 1, 3, 6, 9} include the word "apple." In one embodiment, the catalogs 116 are created and maintained by the email server 100. For example, the EXCHANGE SERVER 2007 email server from MICROSOFT CORPORATION maintains global catalogs containing a variety of searchable data across multiple domains.

The process flow 200 proceeds to 208, where the search API 112 receives the search data 206 in response to performing the index scan. Once the search API 112 receives the search data 206, the process 200 proceeds to 210, where the search API 112 generates the universal frequent word list 118 based on the search data 206. In one embodiment, the API 112 generates the universal frequent word list 118 by counting the number of document identifiers associated with each of the words in the search data 206. For example, in the example shown above, the word "apple" is included in five emails, while the word "bear" is included in three emails. As such, "apple" has a frequency of five, and "bear" has a frequency of three.

The process flow 200 proceeds to 212, where the search API 112 creates the mailbox specific frequent word list 104 based on the universal frequent word list 118. The universal frequent word list 118 includes words and associated frequencies across multiple mailboxes. As such, the search API 112 may filter the universal frequent word list 118 for only words contained in emails associated with a specific mailbox. In one embodiment, the email server 100 maintains a mapping for each mailbox and its corresponding emails. This mapping may be used by the search API 112 to filter the universal frequent word list 118. The process flow 200 then proceeds to 214, where the search API 112 provides the mailbox specific frequent word list 204 to the caller application 102.

The mailbox specific frequent word list 104 may be formatted in XML or other suitable representation. Although not so limited, the mailbox specific frequent word list 104 may be stored as a folder associated item ("FAI") and compressed using suitable compression technology. In one embodiment, the mailbox specific frequent word list 104 may be represented by a data structure specifying a particular mailbox, which is identified by a mailbox identifier. An exemplary XML representation of the mailbox specific frequent word list 104, which is denoted as "TopNWords," is shown below.

```
///<summary>
///TopNWords represents the most frequent words
///occurring in a mailbox. This data may be
///used for voice mail transcription and other
///applications.
```

-continued

```
///</summary>
internal sealed class TopNWords
{
    ///<summary>
    ///Constructor
    ///</summary>
    ///<param name="mailboxGuid"></param>
    internal TopNWords(Guid mailboxGuid)
    {
    }
}
```

As shown above, the mailbox identifier, "mailGuid," associates the mailbox specific frequent word list 104 with a particular mailbox.

Further, the mailbox specific frequent word list 104 may include a data structure containing words and a frequency associated with each of the words. An exemplary XML representation of this data structure, which is denoted as "WordFrequency," is shown below.

```
///<summary>
///Encapsulates a word and its frequency
///</summary>
internal struct WordFrequency
{
    ///<summary>
    ///The keyword
    ///</summary>
    internal string Word;
    ///<summary>
    ///Number of documents the keyword
    ///occurs in.
    ///</summary>
    internal int Frequency;
}
```

As shown above, the data structure "WordFrequency" includes a "Word" and an associated "Frequency."

Figure 3:
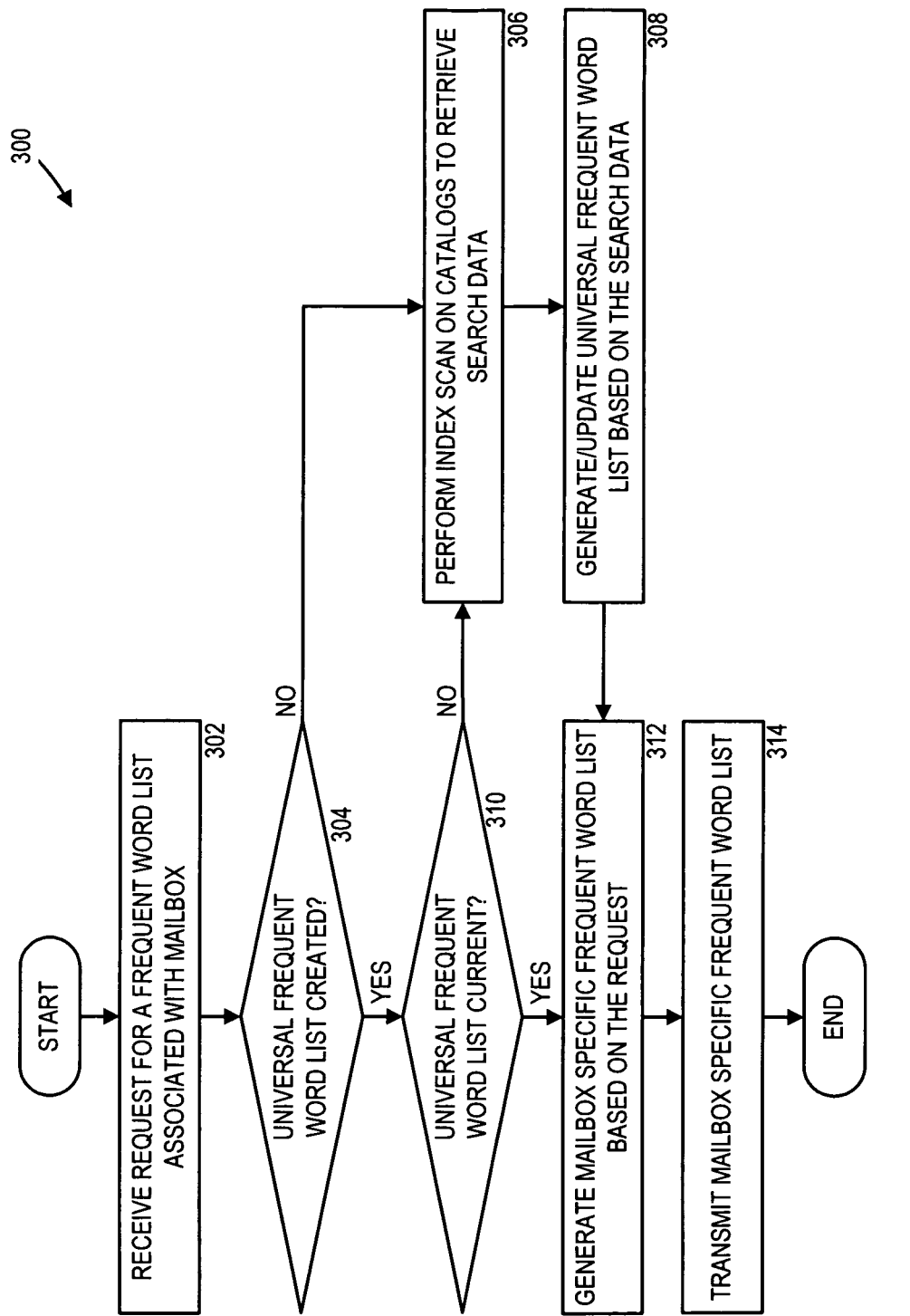
FIG. 3 is a flow diagram showing an illustrative method for generating the mailbox specific frequent word list, in accordance with one embodiment.

Turning now to FIG. 3, additional details will be provided regarding the operation of the search API 112. In particular, FIG. 3 is a flow diagram illustrating aspects of one method provided herein for generating the mailbox specific frequent word list 104. In one embodiment, the search API 112 includes a plurality of objects or other entities capable of performing one or more of the operations described below.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring to FIG. 3, a routine 300 begins at operation 302, where the search API 112 receives, from one of the caller applications 102, a request for a mailbox specific frequent word list, such as the mailbox specific frequent word list 104, for a given mailbox. The request may also specify, among other things, the number of entries included in the mailbox specific frequent word list 104, the minimum/maximum frequency of the entries included in the mailbox specific frequent word list 104, and the minimum/maximum age of the entries included in the mailbox specific frequent word list 104. Upon receiving the request for the mailbox specific frequent word list 104, the routine proceeds to operation 304.

At operation 304, the search API 112 determines whether the universal frequent word list 118 has been created. If the universal frequent word list 118 has not been created, then the routine 300 proceeds to operation 306, where the search API 112 performs an index scan on the catalogs 116 to retrieve the search data 206. In one embodiment, the search data 206 includes an inverted index data structure mapping words to the email identifiers corresponding to emails containing the words. Upon retrieving the search data 206, the routine 300 proceeds to operation 308, where the search API 112 generates the universal frequent word list 118 based on the search data 206. In one embodiment, the universal frequent word list 118 includes a mapping of the words to a frequency associated with each of the words across multiple mailboxes. The frequency may be determined by counting the number of email identifiers corresponding to each of the words. Upon generating the universal frequent word list 118, the routine 300 proceeds to operation 312.

If the universal frequent word list 118 has been created, then the routine 300 proceeds to operation 310, where the search API 112 determines whether the universal frequent word list 118 is current. As previously described, the request transmitted by the calling applications 102 may specify the minimum or maximum age of the entries in the mailbox specific frequent word list 104. If the universal frequent word list 118 is not current, then the routine 300 proceeds to operation 306, where the search API 112 performs an index scan on the catalogs 116 to retrieve the search data 206 and to operation 308 where the search API 112 updates the universal frequent word list 118 based on the search data 206. Upon generating the universal frequent word list 118, the routine 300 proceeds to operation 312.

If the universal frequent word list 118 is current, then the routine 300 proceeds to operation 312, where the search API 112 generates the mailbox specific frequent word list 104 based on the universal frequent word list 118. In one embodiment, the search API 112 filters the words and corresponding frequencies from the universal frequent word list 118 that are associated with only one mailbox. The filtered words and corresponding frequencies then form the mailbox specific frequent word list 104, which may be sorted according to the frequencies. Upon generating the mailbox specific frequent word list 104, the routine 300 proceeds to operation 314, where the search API 112 transmits the mailbox specific frequent word list 104 to the caller applications 102 in response to their request.

Figure 4:
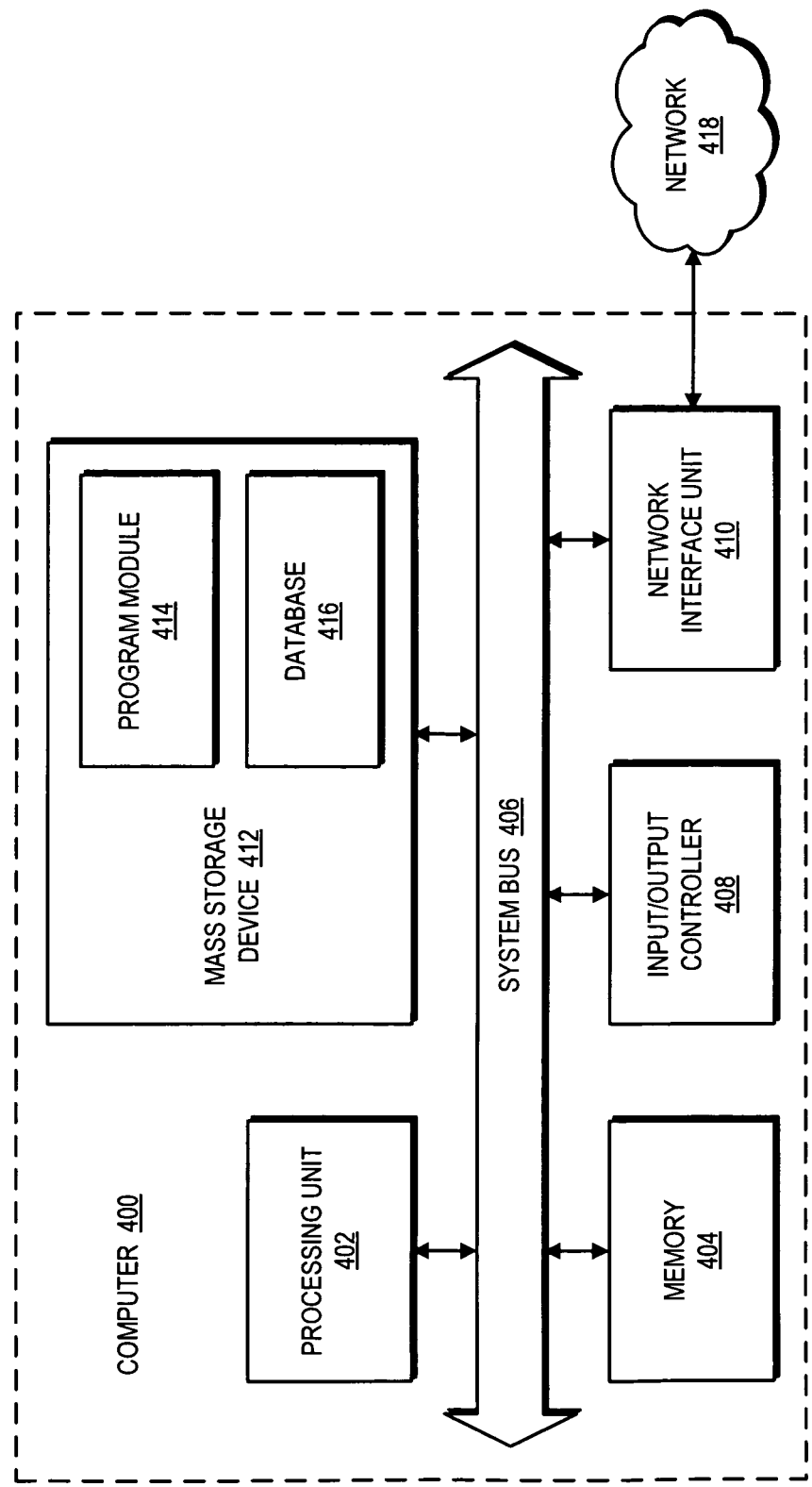
FIG. 4 is a computer architecture diagram showing aspects of an illustrative computer hardware architecture for a computing system capable of implementing aspects of the embodiments presented herein.

Referring now to FIG. 4, an exemplary computer architecture diagram showing aspects of a computer 400 is illustrated. An example of the computer 400 is the email server 100. The computer 400 includes a processing unit 402 ("CPU"), a system memory 404, and a system bus 406 that couples the memory 404 to the CPU 402. The computer 400 further includes a mass storage device 412 for storing one or more program modules 414 and one or more databases 416. Examples of the program modules 414 may include the search API 112 and the applications 108. Examples of the databases 416 may include the catalogs 116, the universal frequent word list 118, the mailbox specific frequent word list 104, and the dictionary 114. The mass storage device 412 is connected to the CPU 402 through a mass storage controller (not shown) connected to the bus 406. The mass storage device 412 and its associated computer-readable media provide non-volatile storage for the computer 400. Although the description of computer-readable media contained herein refers to a mass storage device, such as a hard disk or CD-ROM drive, it should be appreciated by those skilled in the art that computer-readable media can be any available computer storage media that can be accessed by the computer 400.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network 418. The computer 400 may connect to the network 418 through a network interface unit 410 connected to the bus 406. It should be appreciated that the network interface unit 410 may also be utilized to connect to other types of networks and remote computer systems. The computer 400 may also include an input/output controller 408 for receiving and processing input from a number of input devices (not shown), including a keyboard, a mouse, a microphone, and a game controller. Similarly, the input/output controller 408 may provide output to a display or other type of output device (not shown).

Based on the foregoing, it should be appreciated that technologies for generating and using a mailbox specific frequent word list are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for generating a mailbox specific frequent word list associated with a mailbox, comprising:
   performing an index scan on catalogs to retrieve search data mapping words to emails containing the words, the search data provided across multiple mailboxes, the search data comprising an inverted index mapping each of the words to one or more email identifiers identifying each of the emails that contain each of the words;
   generating a universal frequent word list of the emails based on the search data, the universal frequent word list comprising the words contained in the search data and a word frequency associated with each of the words across the multiple mailboxes; and
   generating a plurality of mailbox specific frequent word lists based on the universal frequent word list, each of the plurality of mailbox specific frequent word lists corresponding to one of the multiple mailboxes, each of the plurality of mailbox specific frequent word lists comprising words contained in emails of the corresponding one of the multiple mailboxes and a frequency that the words appear in the emails of the corresponding one of the multiple mailboxes, wherein performing the index scan comprises
  receiving, from an external application, a request for at least one mailbox specific frequent word list of the plurality of mailbox specific frequent word lists,
  upon receiving the request, determining whether the universal frequent word list has been created,
  upon determining that the universal frequent word list has not been created, performing the index scan on catalogs to retrieve search data mapping words to emails containing the words,
  upon determining that the universal frequent word list has been created, determining whether the universal frequent word list is current,
  upon determining that the universal frequent word list is not current, performing the index scan on catalogs to retrieve search data mapping words to emails containing the words, and
  upon determining that the universal frequent word list is current, proceeding directly to generating the plurality of mailbox specific frequent word lists based on the universal frequent word list by filtering the words and the corresponding word frequencies associated with the mailbox.

2. The method of claim 1, wherein generating a universal frequent word list based on the search data comprises:
  determining the word frequency associated with each of the words by counting a number of emails that contain each of the words; and
  generating the universal frequent word list by mapping each of the words to the associated word frequency.

3. The method of claim 2, wherein the word frequency comprises a ratio between the number of emails in the mailboxes that contain each of the words and a total number of emails in the mailboxes.

4. The method of claim 1, wherein frequent word list for the mailbox is stored as a compressed folder associated item ("FAI").

5. The method of claim 1, wherein the catalogs comprise a global catalog created and maintained by an email server across multiple domains.

6. The method of claim 1, wherein the external application comprises an advertising application, and wherein the method further comprises generating, via the advertising application, tailored advertising based on at least one of the mailbox specific frequent word lists.

7. The method of claim 1, wherein the external application comprises a voice transcription application, and wherein the method further comprises adding, via the voice transcription application, at least a portion of the words in at least one of the mailbox specific frequent word lists to a transcription dictionary of the voice transcription application, the transcription dictionary adapted to provide a vocabulary enabling the voice transcription application to phonetically map audio sequences to words in the transcription dictionary.

8. The method of claim 1, wherein the external application comprises an organization application, and wherein the method further comprises generating, via the organization application, email tags based on at least one of the mailbox specific frequent word lists, the email tags adapted to associate searchable categories to the emails.

9. A method for generating a mailbox specific frequent word list associated with a mailbox, comprising:
  receiving, from an external application, a request for the mailbox specific frequent word list from a plurality of mailbox specific frequent word lists;
  upon receiving the request, determining whether a universal frequent word list has been created, the universal frequent word list comprising a mapping of words to corresponding word frequencies across multiple mailboxes;
  upon determining that the universal frequent word list has been created, determining whether the universal frequent word list is current;
  upon determining that the universal frequent word list is not current, performing an index scan on a global catalog to retrieve an inverted index mapping words to email identifiers corresponding to the emails containing the words; and
  upon determining that the universal frequent word list is current, proceeding directly to generating the plurality of mailbox specific frequent word lists based on the universal frequent word list by filtering the words contained in emails associated with the mailbox and the corresponding word frequencies associated with the mailbox;
  upon determining that the universal frequent word list has not been created, performing the index scan on the global catalog to retrieve the inverted index mapping each of the words to the email identifiers corresponding to the emails containing the words;
  generating the universal frequent word list of the emails based on the inverted index; and
  generating the plurality of mailbox specific frequent word lists based on the universal frequent word list by filtering the words and the corresponding word frequencies associated with the mailbox, each of the plurality of mailbox specific frequent word lists corresponding to one of the multiple mailboxes, each of the plurality of mailbox specific frequent word lists comprising words contained in the corresponding one of the multiple mailboxes and the word frequencies that the words appear in the corresponding one of the multiple mailboxes.

10. The method of claim 9, wherein receiving, from an external application, a request for the mailbox specific frequent word list from a plurality of mailbox specific frequent word lists comprises receiving the request for the mailbox specific frequent word list through an application programming interface.

11. The method of claim 9, wherein the request specifies a minimum value or a maximum value of the word frequencies associated with the words included in the mailbox specific frequent word list.

12. The method of claim 9, wherein the request specifies a number of words included in the mailbox specific frequent word list.

13. The method of claim 9, wherein the mailbox specific frequent word list is sorted according to the word frequencies.

14. An apparatus comprising:
  a processor; and
  a computer-readable storage medium having instructions executable by the processor stored thereon, which, when executed by the processor, cause the processor to provide an application programming interface ("API") for generating a mailbox specific frequent word list associated with a mailbox, the API comprising:
    a first object adapted to receive, from an external caller application, a request for the mailbox specific frequent word list from a plurality of mailbox specific frequent word lists, upon receiving the request, determine whether the universal frequent word list has been created;

a second object adapted to
- upon determining that the universal frequent word list has not been created, determine whether the universal frequent word list is current, and
- upon determining that the universal frequent word list is not current, perform an index scan on a global catalog to retrieve an inverted index mapping words to one or more email identifiers identifying each of the emails that contain each of the words;

a third object adapted to generate a universal frequent word list of the emails based on the inverted index, the universal frequent word list of the emails comprising a mapping of the words to corresponding word frequencies across multiple mailboxes, each of the word frequencies specifying a number of emails that contain one of the words;

a fourth object adapted to, upon determining that the universal frequent word list is current, generate the plurality of mailbox specific frequent word lists based on the universal frequent word list by filtering the words contained in emails associated with the mailbox and the corresponding word frequencies associated with the mailbox, each of the plurality of mailbox specific frequent word lists corresponding to one of the multiple mailboxes, each of the plurality of mailbox specific frequent word lists comprising words contained in the corresponding one of the multiple mailboxes and the word frequencies that the words appear in the emails of the corresponding one of the multiple mailboxes; and a fifth object adapted to transmit the mailbox specific frequent word list to the external caller application in response to the first object receiving the request.

15. The apparatus of claim 14, wherein the external caller application comprises an advertising application adapted to generate tailored advertising based on the mailbox specific frequent word list.

16. The apparatus of claim 14, wherein the external caller application comprises a voice transcription application adapted to add at least a portion of the words in the mailbox specific frequent word list to a transcription dictionary, the transcription dictionary adapted to provide a vocabulary enabling the voice transcription application to phonetically map audio sequences to words in the transcription dictionary.

* * * * *